Nov. 9, 1926.

H. HOGAN ET AL 1,606,637

NONSLIP NONSKID AUTO SHOE

Filed Feb. 4, 1925

Harry Hogan
Arthur N. Wickstrom INVENTOR

BY Victor J. Evans
ATTORNEY

WITNESS:

Nov. 9, 1926.
H. HOGAN ET AL
1,606,637
NONSLIP NONSKID AUTO SHOE
Filed Feb. 4, 1925   3 Sheets-Sheet 2
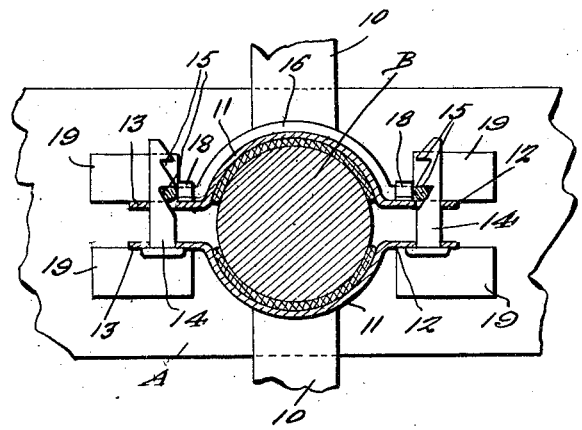
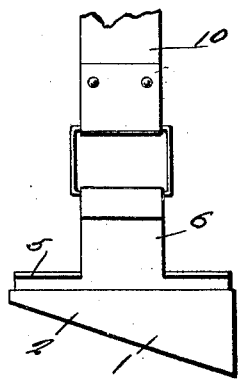
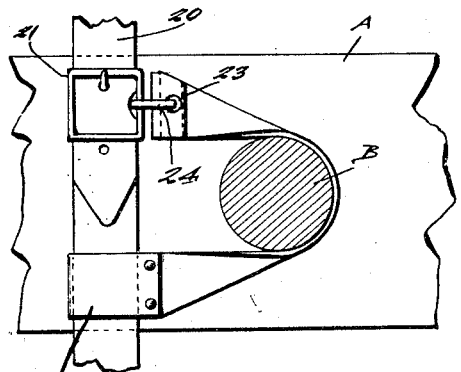
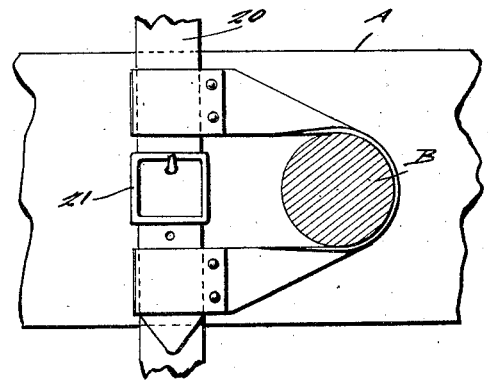
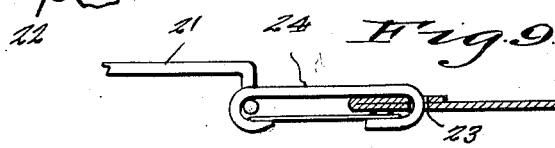
Harry Hogan
Arthur N. Wickstrom   INVENTOR
BY *Victor J. Evans*
ATTORNEY

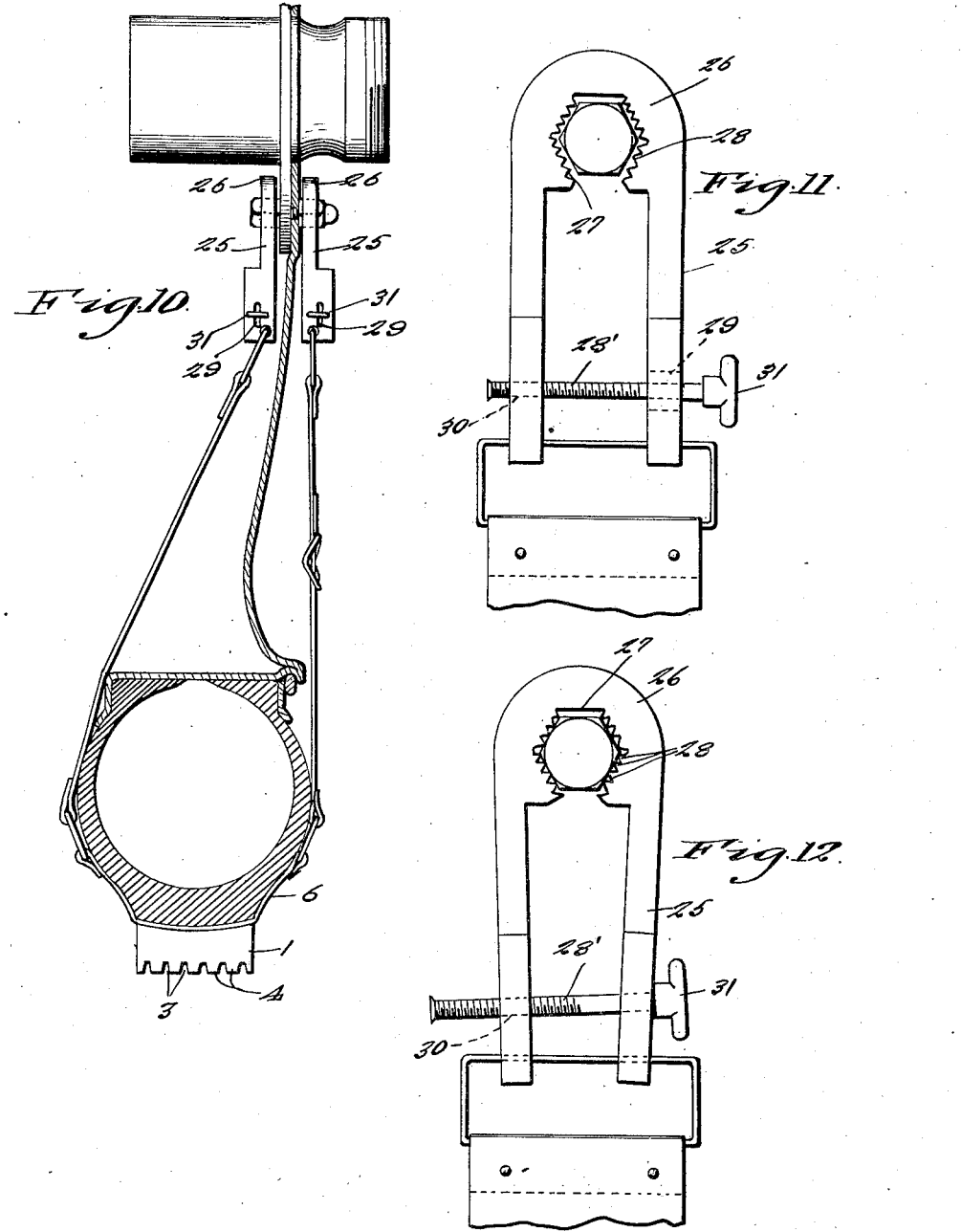

Patented Nov. 9, 1926.

1,606,637

UNITED STATES PATENT OFFICE.

HARRY HOGAN, OF SASKATOON, AND ARTHUR N. WICKSTROM, OF KINISTINO, CANADA.

NONSLIP NONSKID AUTO SHOE.

Application filed February 4, 1925. Serial No. 6,913.

This invention relates to non-skid devices and has for its primary object the provision of a non-skid shoe adapted to be associated with a tire of a vehicle wheel which includes a securing means that may be expeditiously applied to the wheels and removed therefrom with very little effort on the part of the user.

A further object is to provide a non-skid device in the nature of a shoe that can be securely fastened to a tire when used on disk wheels.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 5 is a sectional view taken on line 5—5 of Figure 1.

Figure 6 is a side elevation of the shoe and showing a slightly modified form of strap connecting means.

Figure 7 is a modified form of the shoe securing means to the vehicle wheel.

Figure 8 shows a slight modification of form as shown in Figure 7.

Figure 9 is a detail view of a connecting means for the form as shown in Figure 7.

Figure 10 is a further modified form of securing means and showing how the shoe may be secured to the tire associated with a disk wheel.

Figure 11 is a detail view of one of the securing means of the form as shown in Figure 10.

Figure 12 is a view of the securing means in operative position.

Figure 1:
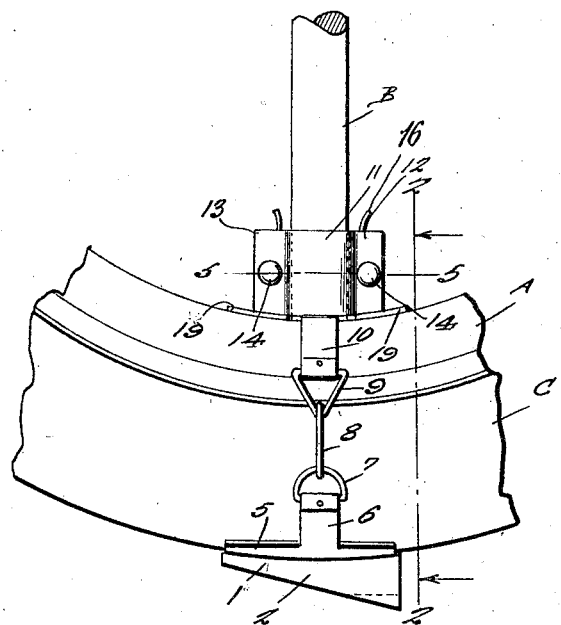
Figure 1 is an elevation of one side of one form of the device showing its application to a fragmentary portion of a vehicle wheel and tire.
Figure 2:
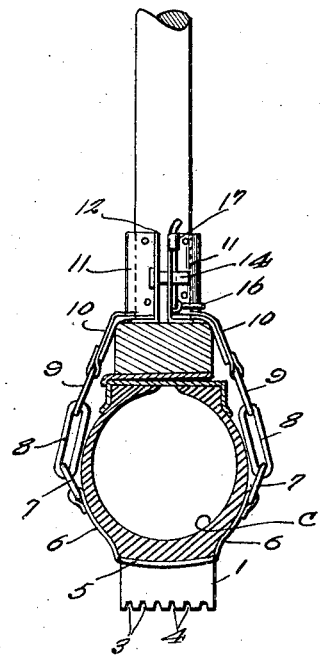
Figure 2 is a sectional view taken on line 2—2 of Figure 1.

Referring to the drawings in detail the letter A indicates the felly of the vehicle wheel of the ordinary construction, B a spoke thereof and C the tire.

The shoe is indicated by the reference numeral 1 and is of the same construction throughout the several views. As shown in Figure 1 the shoe is provided with an inclined outer surface 2 which is grooved at its enlarged end as at 3 to provide parallel non-skidding strips 4 which terminate in alignment adjacent the central portion of the shoe proper. The shoe proper is vulcanized or otherwise secured to a base piece 5 from which extend on opposite sides thereof strips or straps 6 whose ends are secured upon themselves to receive a link of the shoe securing means.

Figure 3:
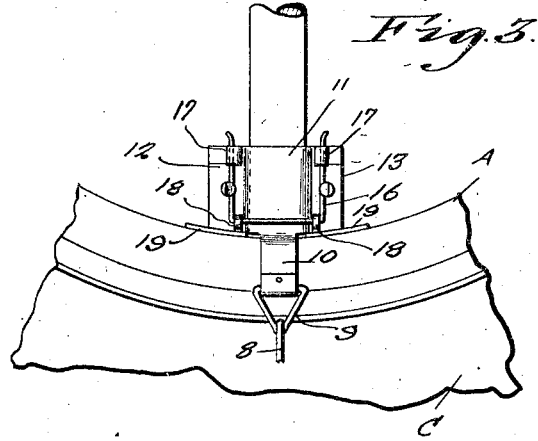
Figure 3 shows the opposite side of the securing means as disclosed in Figure 1.
Figure 4:
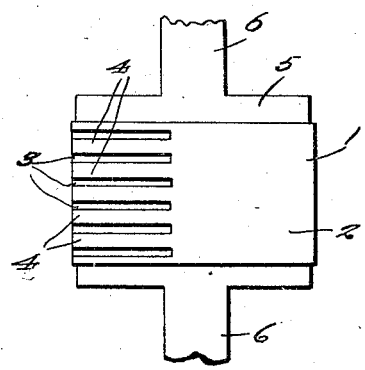
Figure 4 is a plan view of the shoe showing straps thereof broken away.

One form of this securing means is disclosed in Figures 1, 2, 3 and 5 and the link as shown in this form is indicated by the reference numeral 7 in Figure 1 which is associated through the instrumentality of a pair of links 8 and 9 to extension straps 10 formed on the outer portion of cooperating spoke engaging clamps 11. Each of the spoke engaging clamps is provided with felt or other like substance on the inner surface to prevent injury to the spokes of the wheel and these spoke engaging clamps 11 are each provided with ears 12 and 13 which extend from opposite sides of the clamps as shown in Figure 5 of the drawings. The ears 12 are provided with openings adapted to register and the ears 13 are also formed with registering openings and the openings of both of the ears 12 and 13 are for receiving headed stud bolts 14 which have one of their ends toothed as at 15 for the purpose of receiving the arms of a substantially U-shaped latching element 16. The latching element is carried by the clamp having the ears 13 formed thereon through the instrumentality of eyed elements 17 and 18 as shown in Figure 3 of the drawings. Plates 19 are secured to each of the ears of the spoke clamps 11 and engage the inner periphery of the felly to provide a substantial connection between the securing means and the felly as will be readily apparent.

From the form of the securing means above described it will be obvious that the spoke engaging clamps are adjustably associated with respect to each other and through the medium of the toothed stud bolts 14 which are adapted to receive the latching element in the manner as disclosed in Figure 5.

As shown in Figure 6 a slightly modified form of link may be used as a connection between the securing means and the shoe and in this instance the links 8 and 9 are dispensed with and the strip or straps 6 are secured directly to the extension straps 10 by the link.

The securing means for the shoe as shown in Figures 7, 8 and 9 include a strap 20 which is adapted to engage the inner periphery of the felly and has its ends connected through the medium of a buckle 21 and as shown in Figure 7 the spoke engaging element is a strip of flexible material having one end secured to the strap 20 by a slidable connection 22 while the opposite end is provided with an opening 23 for the reception of snap fastener 24 which is adapted to be secured to the buckle 21. In Figure 8 the ends of the flexible element are both provided with a slidable connection.

In Figures 10, 11 and 12 there is disclosed a securing means for the shoe when the same is adapted to be used on a tire employed with a disk wheel which has the intermediate portion of the wheel fixed to the flange of the hub through the medium of a bolt having a wrench engaging head on one end and which is threaded to accommodate a nut as shown. The shoe as disclosed in these last mentioned figures is of the same construction as above described and has fixed to its strap 6 thereof links for connecting the straps which are in turn connected to means for associating the same to the head and nut of the bolt, such means being substantially cooperating U-shaped members 25 having their intermediate portion enlarged as at 26 and which is formed to provide a substantially hexagon shaped recess 27. Extending inwardly from each of the sides of the hexagon recess are teeth 28 adapted to impinge the nut or head portion of the bolt when the arms of the member 25 are moved toward each other through the medium of a threaded bolt 28' which passes through a slot 29 of one arm of the member and is threadedly secured in an opening 30 of the opposite arm, the free end of the bolt 28 being slightly headed to prevent the entire removal thereof from the threaded opening 30. The opposite end of the bolt 28 has secured thereto a thumb engaging nut 31 for the operation of the bolt as will be readily apparent. From this structure it will be obvious that the U-shaped members 25 are resilient and upon rotation of the bolt for moving the arms of the members toward each other the teeth 28 will form a substantial connection to the bolts of the flange and intermediate portion of the disk wheel for retaining the shoe 1 in operative position on the tire as shown in Figure 10.

It is thought from the foregoing description that the advantages and novel features of our invention will be readily apparent.

We desire it to be understood that we may make changes in the construction and in the combination and arrangement of the several parts, provided that such changes fall within the scope of the appended claims.

Having thus described our invention we claim:

1. A non-skid shoe of the character described comprising a base piece, a shoe proper fixed to the base piece and being formed with an inclined outer surface, said shoe proper being grooved at its enlarged end to provide non-skid strips thereon and means for securing said base piece in association with a vehicle tire.

2. A non-skid shoe for vehicle wheels comprising a base piece adapted to engage the ground engaging surface of a tire of the wheel, a shoe proper secured to said base piece, strips extending from diametrically opposite sides of said base piece, a pair of cooperating spoke engaging clamps engaging the spokes of the wheels, apertured ears formed on the spoke engaging clamps, a substantially U-shaped member fixed to one of said clamps, toothed studs passing through the apertured ears and adapted to be secured by engagement with the substantially U-shaped member, extension strips formed on the outer portion of the clamps and flexible means between the extension straps and strips of the base piece for connecting the same in operative position.

H. HOGAN.
ARTHUR N. WICKSTROM.